United States Patent
Uenaka (10) Patent No.: US 7,505,077 B2
(45) Date of Patent: Mar. 17, 2009

(54) LIGHTING CONTROL APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 791 days.

(21) Appl. No.: 10/969,873

(22) Filed: Oct. 22, 2004

(65) Prior Publication Data

US 2005/0088568 A1    Apr. 28, 2005

(30) Foreign Application Priority Data

Oct. 27, 2003    (JP) ............................ P2003-365965

(51) Int. Cl.
*H04N 5/222* (2006.01)
*G03B 7/00* (2006.01)

(52) U.S. Cl. ................... 348/370; 348/371; 348/345

(58) Field of Classification Search ............... 348/370, 348/371, 345
See application file for complete search history.

(56) References Cited

U.S. PATENT DOCUMENTS

| | | | |
|---|---|---|---|
| RE36,726 E * | 6/2000 | Kakiuchi | 396/263 |
| 6,135,354 A * | 10/2000 | Kubon | 235/462.11 |
| 6,366,737 B1 | 4/2002 | Numako et al. | |
| 6,498,900 B1 | 12/2002 | Nakata et al. | |
| 6,700,614 B1 * | 3/2004 | Hata | 348/345 |
| 2003/0052992 A1 * | 3/2003 | Nakata | 348/371 |
| 2004/0258165 A1 * | 12/2004 | Peltonen | 375/257 |

FOREIGN PATENT DOCUMENTS

| | | | |
|---|---|---|---|
| GB | 2380790 A | * | 4/2003 |
| JP | 2001-215579 | | 8/2001 |
| JP | 2003-101836 | | 4/2003 |

OTHER PUBLICATIONS

English language Abstract of JP 2003-101836.
English language Abstract of JP 2001-215579.

* cited by examiner

*Primary Examiner*—Nhan T. Tran
*Assistant Examiner*—Mekonnen Dagnew
(74) *Attorney, Agent, or Firm*—Greenblum & Bernstein, P.L.C.

(57) ABSTRACT

A lighting control apparatus of a photographing apparatus comprises a lighting device, a continuous imaging control processor, and a pulse-signal generating processor. The lighting device illuminates a photographic subject by receiving a pulse signal which has a certain cycle. The continuous imaging control processor performs a continuous imaging operation where a plurality of images of the photographic subject are continuously imaged. The pulse-signal generating processor supplies the pulse signal to the lighting device with a first duty ratio in the exposure time, and with a second duty ratio which is smaller than the first duty ratio in a post-exposure time which is the time between the exposure time termination and the next exposure time start.

16 Claims, 7 Drawing Sheets

LIGHTING CONTROL APPARATUS

BACKGROUND OF THE INVENTION

1. Field of the Invention

The present invention relates to a lighting control apparatus for a photographing apparatus, and in particular to improvement of the lighting action in the continuous or video mode.

2. Description of the Related Art

A lighting device which uses LEDs is proposed, in place of a lighting device which uses strobe radiation such as a xenon pipe which has been widely used with photographing apparatus, such as a camera. LEDs can be driven at a low voltage, and the circuit construction of the LED is simple.

Figure 1:
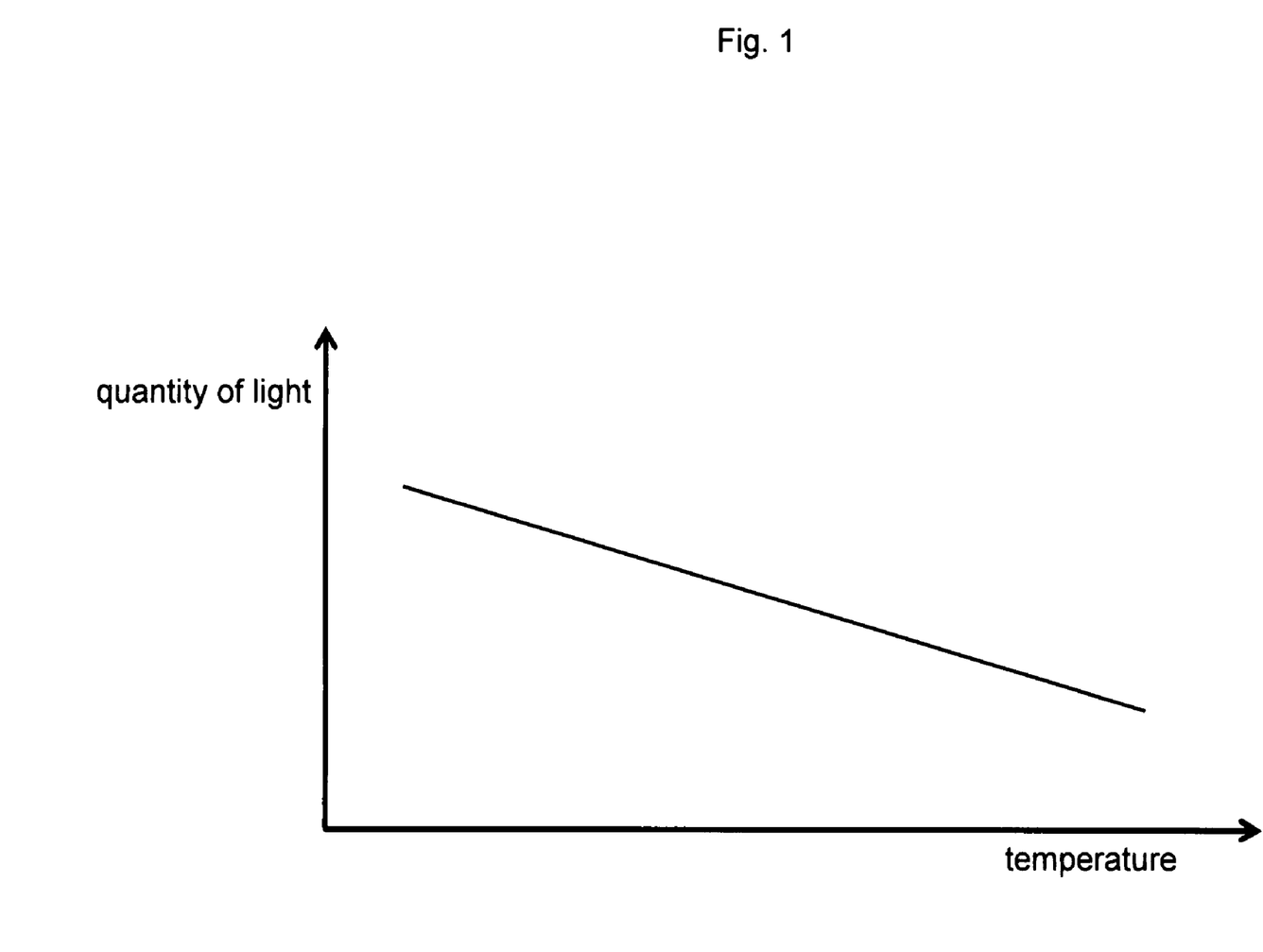
FIG. 1 shows a graph of the relationship between temperature of the LED and the quantity of light output by the LED.

However, the temperature of an LED goes up due to continuous radiation of the LED. The rise in the LED temperature causes a decrease of the quantity of light emitted by the LED. FIG. 1 shows the relation between the temperature rise and the quantity of light emitted by the LED, so that FIG. 1 shows that the quantity of light, in other words, the brightness of the LED falls along with the temperature rise of the LED.

Japanese unexamined patent publication (KOKAJ) No. 2003-101836 discloses a lighting device for a photographing apparatus. The radiation of light from the LEDs is driven by rectangular pulse signals, and a continuous imaging operation can be carried out while the LEDs radiate light.

Because a turn-off period is provided in the pulse signal, the LED radiation caused by this pulse signal is not continuous, hence the temperature rise of the LED due to the heat that occurs with continuous radiation is reduced in comparison to the temperature produced by the LED radiation when the direct current signal is used to drive the LED.

Figure 2:
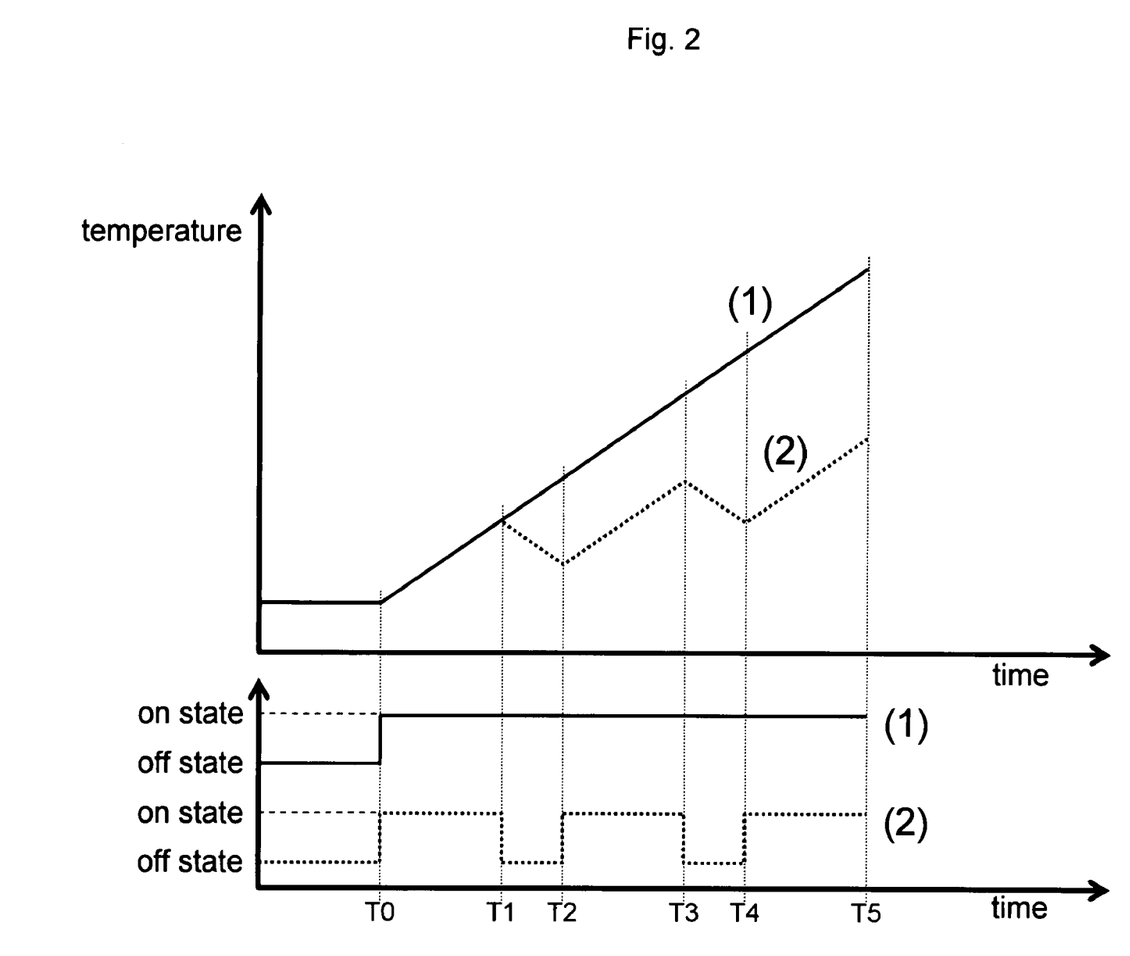
FIG. 2 shows a graph of the temperature change in the LED over time for the direct current signal and for the pulse signal.

FIG. 2 shows a graph where the horizontal axis represents time and the vertical axis represents temperature. The graph shows the difference in temperature rise of the LED due to the direct current signal ((1) in FIG. 2) and the temperature rise of the LED due to the pulse signal ((2) in FIG. 2).

When the pulse signal and the direct current signal are in the on state, the LED for lighting is illuminated.

In the case of the direct current signal, because a constant current flows during the period for which the LED should be illuminated (T0~T5), the temperature of the LED continues to go up.

In the case of the pulse signal, the period for which the LED is not illuminated is the period which the signal is in the off state (T1~T2, T3~T4), so that the temperature of the LED descends in this period (T1~T2, T3~T4). Accordingly, during the illumination period of the LED, the temperature of the LED repeats the rise and descent. As a result, the accumulation of heat is small in comparison with in the case where the direct current signal is used.

However, the above-discussed Japanese unexamined patent publication does not disclose whether the LED radiates in the period between the exposure time termination and the next exposure time start, in other words the post-exposure time, in the continuous shot mode.

When the radiation of the LED is continued in the post-exposure time similar to the exposure time period, the heat of the LED gradually accumulates, so that the rise in temperature of the LED can not be restrained, even if using the pulse signal.

When the radiation of the LED is stopped during the post-exposure time, the temperature rise of the LED can be restrained. However, the composition of an image of the photographing apparatus can not be confirmed in a frame period, in the continuous shot mode, so that it is difficult to shoot a moving photographic subject.

SUMMARY OF THE INVENTION

Therefore, an object of the present invention is to provide an apparatus for which the composition of an image can be confirmed while the accumulation of heat caused by the continuous radiation of a LED etc. of a lighting device is restrained, in a continuous shot mode or a video mode.

According to the present invention, a lighting control apparatus of a photographing apparatus comprises a lighting device, a continuous imaging control processor, and a pulse-signal generating processor.

The lighting device illuminates a photographic subject by receiving a pulse signal which has a certain cycle.

The continuous imaging control processor performs a continuous imaging operation where a plurality of images of the photographic subject are continuously imaged.

The pulse-signal generating processor supplies the pulse signal to the lighting device with a first duty ratio in the exposure time, and with a second duty ratio which is smaller than the first duty ratio in a post-exposure time which is the time between the exposure time termination and the next exposure time start.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 3:
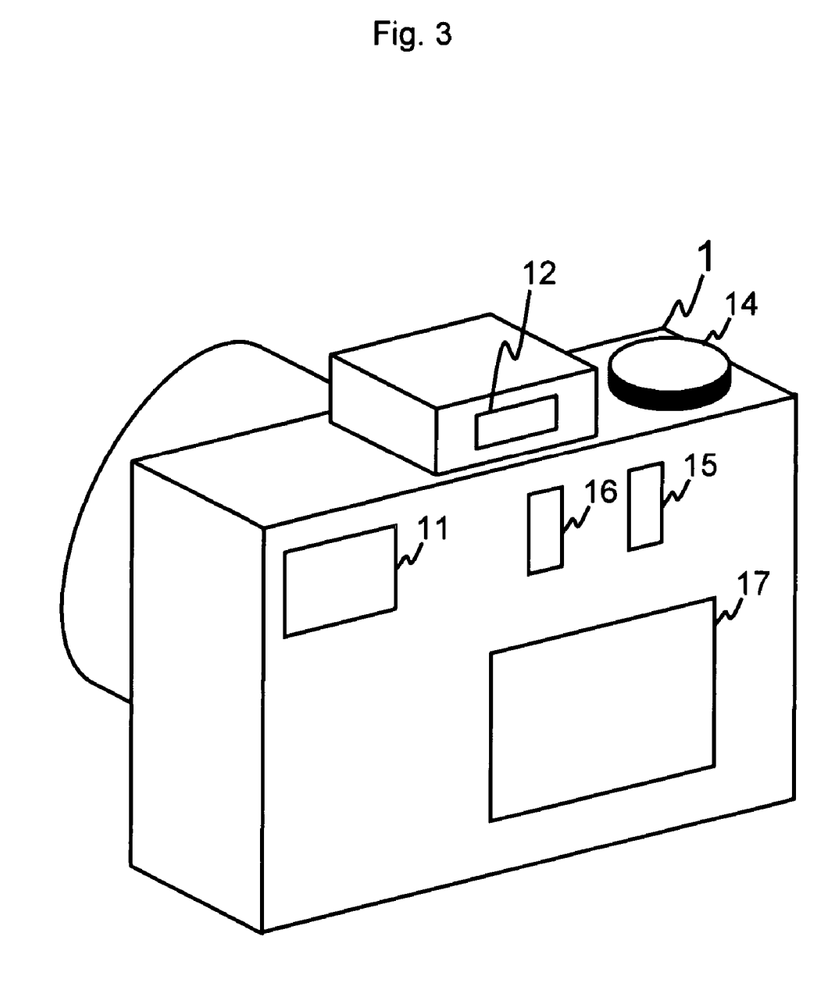
FIG. 3 is a perspective view of a photographing apparatus of this embodiment viewed from the back side of the photographing apparatus.
Figure 4:
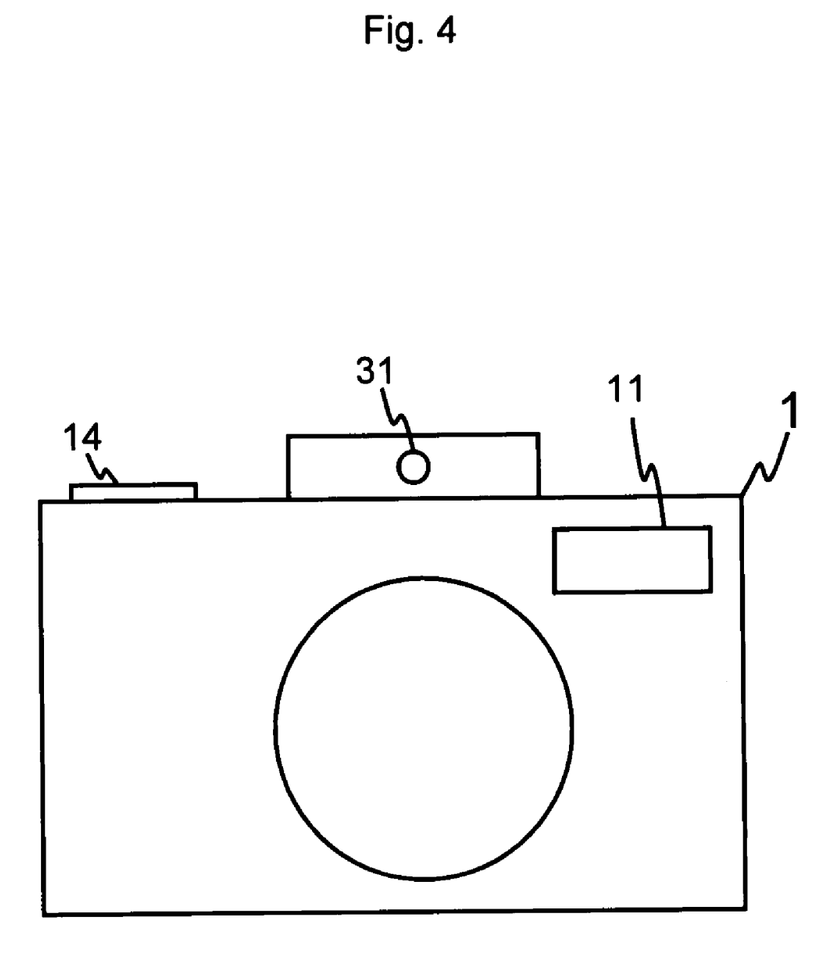
FIG. 4 is a front view of the photographing apparatus of this embodiment.
Figure 5:
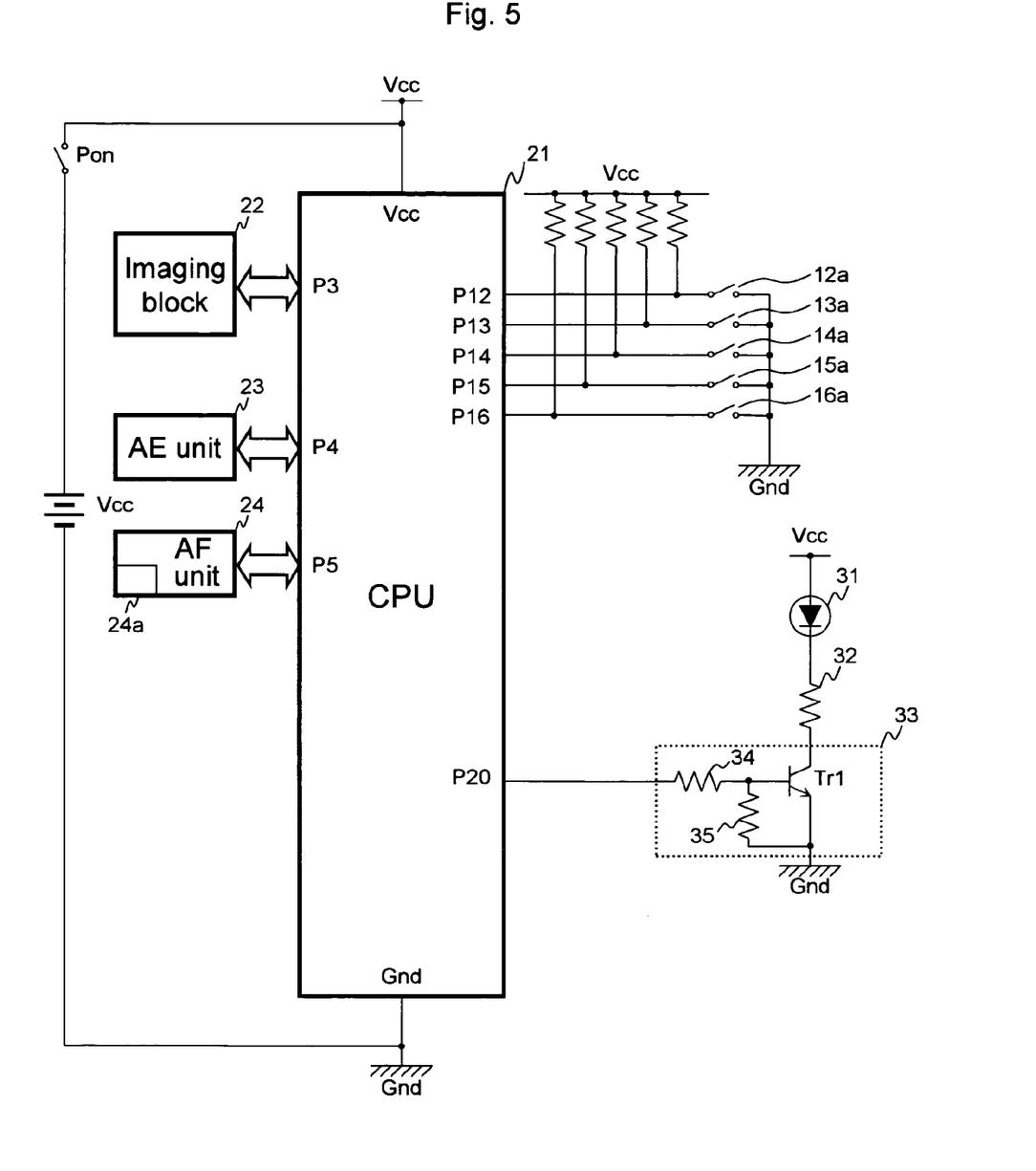
FIG. 5 is a circuit construction figure of the photographing apparatus.

The present invention is described below with reference to the embodiments shown in the drawings. FIG. 3 shows a perspective view of a photographing apparatus 1 which comprises a lighting control unit of this embodiment, viewed from the back of the photographing apparatus 1. FIG. 4 is a front view of the photographing apparatus 1. FIG. 5 is a circuit construction diagram of the photographing apparatus 1. In this embodiment, the photographing apparatus 1 is a digital camera.

The photographing apparatus 1 comprises an optical finder 11, an LED on button 12, an LED on switch 12a, a photometric switch 13a, a release button 14, a release switch 14a, a continuous shot button 15, a continuous shot switch 15a, a video button 16, a video switch 16a, an LCD monitor 17, an LED 31 for lighting, and an illuminating circuit 33.

The photographing apparatus 1 comprises a CPU 21, an imaging block 22, an AE (automatic exposure) unit 23, and an AF (automatic focusing) unit 24. The imaging block 22 is composed of an imaging device such as a CCD etc. (which is not depicted). The AE unit 23 performs the photometric operation for the photographic subject, calculates the photometric values, and calculates the aperture value and the time length of the exposure time which is needed for the imaging corresponding to the photometric values. The AF unit 24 performs the AF sensing operation, and performs the focusing operation which is needed for the imaging, corresponding to the result of the AF sensing operation.

The optical finder 11 is an apparatus which can be used to optically observe the photographic subject image. The photographic subject image can also be indicated on the LCD 17, as an image which is imaged by the imaging block 22.

When the LED on button 12 is pushed by the operator, the LED on switch 12a changes to the on state, so that the LED 31 is illuminated in the exposure time etc.

When the release button 14 is half pushed by the operator, the photometric switch 13a changes to the on state, so that the photometric operation, the AF sensing operation, and the focusing operation are performed.

When the release button 14 is fully pushed by the operator, the release switch 14a changes to the on state, so that the imaging operation is performed.

When the continuous shot button 15 is pushed by the operator, the continuous shot switch 15a changes to the on state, and a plurality of the photographic subject images are continuously imaged, for example three frames per second, while the release switch 14a is in the on state. When the continuous shot switch 15a is in the on state, the photographing apparatus 1 is in a continuous shot mode.

When the video button 16 is pushed by the operator, the video switch 16a changes to the on state, so that the photographic subject image is imaged at a predetermined frame interval, and is stored as a moving picture, while the release switch 14a is in the on state. When the video switch 16a is in the on state, the photographing apparatus 1 is in a video mode.

The LED 31 is a lighting device which supplies a proper quantity of light to the photographic subject, to illuminate the photographic subject, during an exposure time, as an electric flash, and a post-exposure time for confirming the composition, in accordance with the exposure time, when there is insufficient lighting of the photographic subject.

The LED 31 is driven in accordance with pulse signals which are output from the CPU 21 and are supplied through the illuminating circuit 33 (which is described later).

The pulse signals are rectangular wave signals of which the on state and off state are continuously switched according to a certain on/off cycle (which is equal to the reciprocal of the value of the duty frequency). It is desirable that the value of the duty frequency is larger than or equal to 50 Hz, in other words the value of the on/off cycle should be smaller than or equal to 1/50 of a second, so that flickering does not occur in the LED 31. In this embodiment, the value of the duty frequency is set in the CPU 21 in advance, however the value of the duty frequency may be changed by the operator.

The on/off cycle of the LED 31 is synchronized with the on/off cycle of the pulse signal, during illumination.

In this embodiment, a duty ratio is defined as the ratio of time in the on state, to the time of one cycle of the pulse signal. The pulse signal is output with a first duty ratio D1 during the exposure time in which an imaging operation is performed. The pulse signal is output with a second duty ratio D2 between the exposure time termination and the next exposure time start, in other words the post-exposure time, or at a time other than that for the exposure operation, when the photographing apparatus 1 is in the continuous shot or video mode. The value of the first duty ratio D1 is larger than the value of the second duty ratio D2, and is smaller than 100%. The second duty ratio D2 has two values, so that one is larger than 0% for illuminating the LED 31 in the post-exposure time, the other is 0% for turning-off the LED 31 in the post-exposure time. The first and second duty ratios D1 and D2 are set in the CPU 21 in advance.

In this embodiment, whenever the LED on switch 12a is switched to the on sate by the operator, the LED 31 is automatically illuminated in the exposure time etc., however the LED 31 may be automatically illuminated in the exposure time etc., corresponding to the photometric value obtained from the photometric operation.

The various output commands corresponding to the input signals of these switches are controlled by the CPU 21. The CPU 21 stores a defocus value DEF which is used for judging whether the LED 31 should be illuminated in the post-exposure time.

The information whether the LED on switch 12a is in the on state or in the off state, is input to a port P12 of the CPU 21 as a 1 bit digital signal. The information whether the photometric switch 13a is in the on state or in the off state, is input to a port P13 of the CPU 21 as a 1 bit digital signal. The information whether the release switch 14a is in the on state or in the off state, is input to a port P14 of the CPU 21 as a 1 bit digital signal. The information whether the continuous shot switch 15a is in the on state or in the off state, is input to a port P15 of the CPU 21 as a 1 bit digital signal. The information whether the video switch 16a is in the on state or in the off state, is input to a port P16 of the CPU 21 as a 1 bit digital signal.

The imaging block 22 is connected to a port P3 of the CPU 21 for inputting and outputting signals. The AE unit 23 is connected to a port P4 of the CPU 21 for inputting and outputting signals. The AF unit 24 is connected to a port P5 of the CPU 21 for inputting and outputting signals.

The illuminating circuit 33 which illuminates the LED 31, is connected to a port P20 of the CPU 21. The port 20 of the CPU 21 outputs the control signals for outputting the pulse signals with a predetermined duty ratio (one of the first and second duty ratios D1 and D2) from the illuminating circuit 33.

The pulse signals output from the illuminating circuit 33 are supplied to the LED 31 through a limited resistor 32. Accordingly, the CPU 21 and the illuminating circuit 33 have a pulse signal generating function which supplies the pulse signal to the LED 31 with one of the first and second duty ratios D1 and D2.

The illuminating circuit 33 is composed of a transistor Tr1, a first bias resistor 34, and a second bias resistor 35. The transistor Tr1 is an NPN transistor which performs the switching of the pulse signal supplied to the LED 31, and whose base is connected to the CPU 21 through the first bias resistor 34. The second bias resistor 35 is connected between the base of the transistor Tr1 and the emitter of the transistor Tr1.

When the release button 14 is half pushed, the photometric switch 13a is set in the on state, so that the port P13 inputs the on state signal. The CPU 21 drives an AE sensor (which is not depicted) of the AE unit 23, so that the AE unit 23 performs the photometric operation, calculates the photometric value, and then calculates the aperture value and the exposure time, which are needed for imaging, corresponding to the photometric values. The CPU 21 drives a sensor (which is not depicted) of the AF unit 24, so that the AF unit 24 performs the AF sensing operation. Further a lens control circuit 24a of the AF unit 24 (which is not depicted) is driven, and the focusing operation which is needed for imaging, is performed by moving the lens position in the light axis direction, corresponding to the result of the AF sensing operation.

When the release button 14 is fully pushed, the release switch 14a is set in the on state, so that the port 14 inputs the on state signal. The CPU 21 performs the imaging operation, or the CPU 21 drives an aperture mechanism (which is not depicted) corresponding to the aperture value, drives a release of the shutter mechanism (which is not depicted) with a predetermined shutter speed, and then drives the imaging block 22 for the exposure.

When the LED on switch 12a and the release switch 14a are set in the on state, on state signals are input to the ports P12 and P14, so that the pulse signal is output in accordance with the exposure timing of the imaging block 22, through the illuminating circuit 33, for illuminating the LED 31. The pulse signal is controlled by the CPU 21.

When the release switch 14a and the continuous shot switch 15a are set in the on state, on state signals are input to the ports P14 and P15. The imaging operation controlled by the CPU 21, is continuously performed at certain intervals, while the release switch 14a is in the on state, in other words the release of the shutter mechanism is driven, the imaging block 22 is driven, and the exposure operation is performed. The certain intervals are set in the photographing apparatus 1 by the operator, in order to take continuous still images, for example ⅓ second. Accordingly, the CPU 21 has a continuous shot control function which continuously performs a plurality of exposure operations of the photographic subject.

When the release switch 14a and the video switch 16a are set in the on state, on state signals are input to the ports P14 and P16. The imaging operation controlled by the CPU 21, is continuously performed at predetermined intervals, while the release switch 14a is in the on state, in other words the release of the shutter mechanism is driven, the imaging block 22 is driven, and the exposure operation is performed. The predetermined intervals are set in the photographing apparatus 1 in advance, in order to take a video image, for example ¹⁄₆₀ second (which is equal to one frame period).

When the LED on switch 12a, the release switch 14a, and the continuous shot switch 15a are set in the on state, a pulse signal is output to the LED 31, through the illuminating circuit 33, on the basis of the control signal from the port 20 of the CPU 21, during the exposure time and the post-exposure time. During the exposure time, the pulse signal is output with the first duty ratio D1. During the post-exposure time, the pulse signal is output with the second duty ratio D2.

The second duty ratio D2 is set to one of two values corresponding to the result of the AF sensing operation.

When the result of the current AF sensing operation, which was performed immediately after the release switch 14a was switched to the on state and immediately before the current exposure operation, is different from the result of the previous AF sensing operation, which was performed immediately before the release switch 14a was switched to the on state and immediately after the photometric operation, or which was performed immediately before the release switch 14a was switched to the on state and immediately before the previous exposure operation, a new focusing operation is needed, so that the value of the second duty ratio D2 is set to the value which is larger than 0%, and which is smaller than the first duty ratio D1. Accordingly, the LED 31 is illuminated in the post-exposure time under the condition where the light quantity during the post-exposure time is less than the light quantity during the exposure time.

When the result of the current AF sensing operation, which was performed immediately after the release switch 14a was switched to the on state and immediately before the current exposure operation, is the same as the result of the previous AF sensing operation, which was performed immediately before the release switch 14a was switched to the on state and immediately after the photometric operation, or which was performed immediately before the release switch 14a was switched to the on state and immediately before the previous exposure operation, a new focusing operation is not needed, so that the value of the second duty ratio D2 is set to the value which is 0%. Accordingly, the LED 31 is not illuminated in the post-exposure time.

The condition, where a new focusing operation is needed, means that the object distance in the current AF sensing is different from the object distance in the previous AF sensing, because the photographic subject which is imaged has moved. In this embodiment, the object distance is defined as the distance between the area which should be focused for the photographic subject and the photographing apparatus 1.

When the LED on switch 12a, the release switch 14a, and the video switch 16a are set in the on state, the pulse signal is output to the LED 31, through the illuminating circuit 33, on the basis of the control signal from the CPU 21, during the exposure time and the post-exposure time, similar to when the LED on switch 12a, the release switch 14a, and the continuous shot switch 15a are set in the on state.

Figure 6:
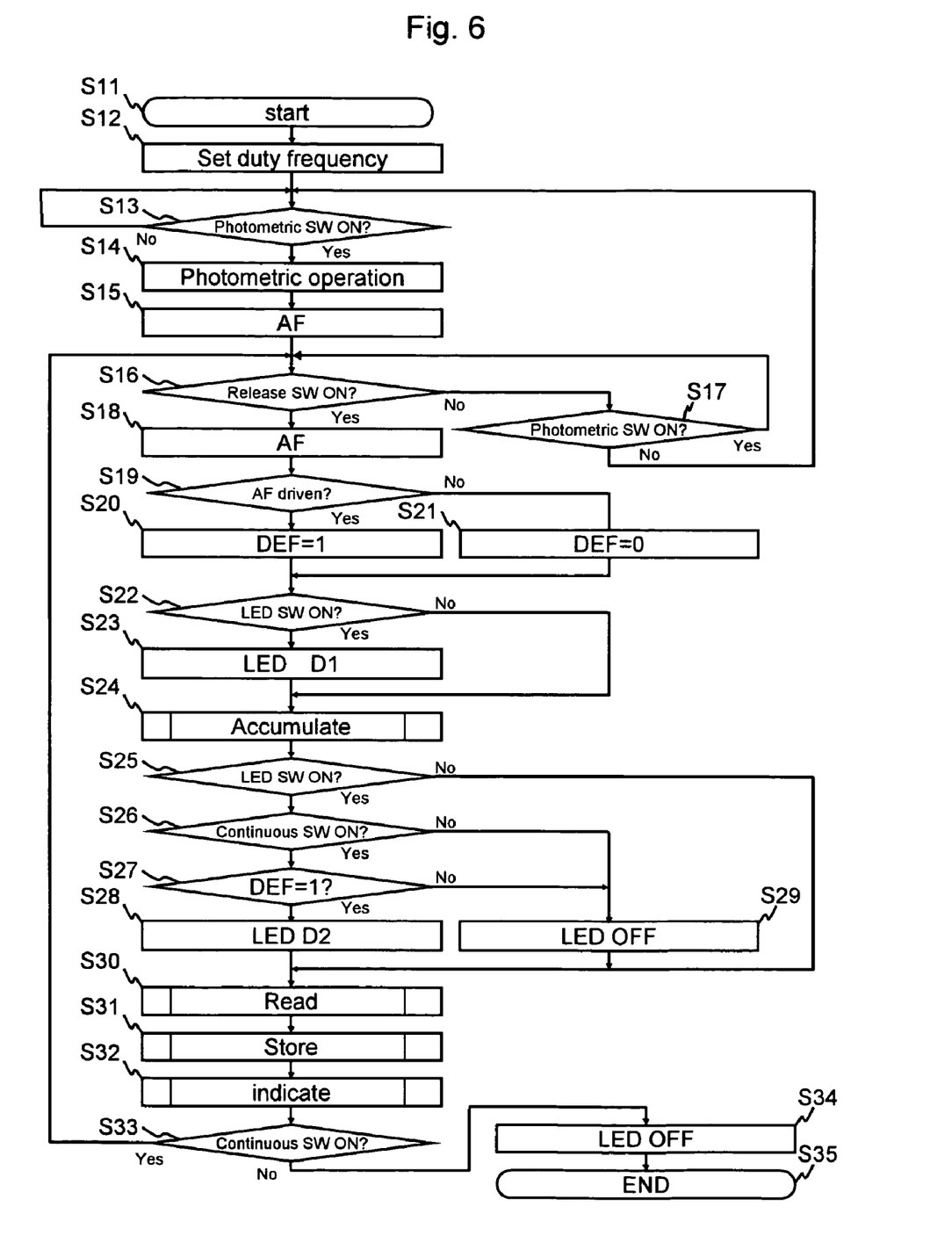
FIG. 6 is a flowchart of the LED illumination process in the exposure time and in the post-exposure time.

The control of the LED 31 in the post-exposure time, in a continuous shot mode (where the continuous shot switch 15a is in the on state), is explained by the flowchart in FIG. 6.

In step S11, the power supply of the photographing apparatus 1 is set in the on state. In step S12, the duty frequency is set in the CPU 21. However, the value of the duty frequency is set in the CPU 21 in advance.

In step S13, it is judged whether the photometric switch 13a is set in the on state. When it is judged that the photometric switch 13a is not set in the on state, the process in step S13 is repeatedly carried out. When it is judged that the photometric switch 13a is set in the on state, the AE sensor of the AE unit 23 is driven, the photometric operation is performed, and the aperture value and the exposure time are calculated in step S14. In step S15, the AF sensor of the AF unit 24 is driven, the AF sensing is performed, and the focusing operation is performed, by driving the lens control circuit 24a of the AF unit 24.

In step S16, it is judged whether the release switch 14a is set in the on state. When it is judged that the release switch 14a is not in the on state, it is judged whether the photometric switch 13a is set in the on state, in step S17. When it is judged that the photometric switch 13a is set in the on state in step S17, the flow is returned to step S16. When it is judged that the photometric switch 13a is not set in the on state in step S17, the flow is returned to step S13. When it is judged that the release switch 14a is set in the on state in step S16, the AF sensor of the AF unit 24 is driven and the AF sensing is performed in step S18.

When the result of the AF sensing operation in step S18 is the same as the result of the AF sensing operation before step S18, so that the lens position does not need to be changed, in other words a new focusing operation is not needed, the lens control circuit 24a of the AF unit 24 is not driven. Or, the lens position is not changed.

In step S19, it is judged whether the lens control circuit 24a of the AF unit 24 is driven during step S18.

In the case of the first exposure operation in the continuous shot mode, when the result of the current AF sensing operation in step S18 is different from the result of the previous AF sensing operation in step S15 (before the release switch 14a was switched to the on state in step S16 and after the photometric operation in step S14), the lens control circuit 24a is driven for the new focusing operation.

In the case of the second or greater exposure operation (the exposure time subsequent to the second time), in the continuous shot mode, when the result of the current AF sensing operation in step S18 of the current routine is different from the result of the previous AF sensing operation in step S18 of the previous routine (before the release switch 14a was switched to the on state in step S16 of the current routine and before the previous exposure operation), the lens control circuit 24a is driven for the new focusing operation.

Then, the object distance is changed every frame.

Accordingly, in the post-exposure time, which is the period from when the current exposure operation is terminated to when the next exposure operation is started, the composition-confirmation (framing-confirmation) is needed, so that, for example the LED 31 is illuminated. Therefore, when the lens control circuit 24a of the AF unit 24 is driven, the CPU 21 stores the defocus value to 1 in step S20 (DEF=1), as it is judged that a defocus has occurred.

In the case of the first exposure operation in the continuous shot mode, when the result of the current AF sensing operation in step S18 is the same as the result of the previous AF sensing operation in step S15 (before the release switch 14a was switched to the on state in step S16 and after the photometric operation in step S14), the lens control circuit 24a is not driven for the new focusing operation.

In the case of the second or greater exposure operation (the exposure time subsequent to the second time), in the continuous shot mode, when the result of the current AF sensing operation in step S18 of the current routine is the same as the result of the previous AF sensing operation in step S18 of the previous routine (before the release switch 14a was switched to the on state in step S16 of the current routine and before the previous exposure operation) the lens control circuit 24a is not driven for the new focusing operation.

Then, the object distance is not changed every frame.

Accordingly, the composition-confirmation is not needed in the post-exposure time. Therefore, when the lens control circuit 24a of the AF unit 24 is not driven, the CPU 21 stores the defocus value to 0 in step S20 (DEF=0), as it is judged that a defocus has not occurred.

The defocus value (DEF value) is used in step S27 that is, it is judged whether the LED 31 should be illuminated in the post-exposure time.

In step S22, it is judged whether the LED on switch 12a is in the on state. When it is judged that the LED on switch 12a is in the on state, the pulse signal is supplied to the LED 31 with the first duty ratio D1 in step S23, so that the exposure operation, in other words electric charge accumulation of the CCD, is performed under the condition where the LED 31 is illuminated, in step S24. When it is judged that the LED on switch 12a is not in the on state, the pulse signal is not supplied to the LED 31, so that the exposure operation, in other words electric charge accumulation of the CCD, is performed under the condition where the LED 31 is not illuminated, in step S24.

After the exposure time has passed, it is judged whether the LED on switch 12a is in the on state, in step S25. When it is judged that the LED on switch 12a is in the on state, it is judged whether the continuous shot switch 15a is in the on state in step S26. When it is judged that the continuous shot switch 15a is in the on state, it is judged whether the defocus value DEF which is stored in the CPU 21 is set to 1 (DEF=1) in step S27. When it is judged that the defocus value DEF is set to 1, the pulse signal is supplied to the LED 31 with the second duty ratio D2, so that the LED 31 is illuminated in the post-exposure time, with the light quantity which is less than that in the exposure time. The value of the second duty ratio D2 in step S28 is larger than 0%.

When it is judged that the LED on switch 12a is not in the on state in step S25, the process is advanced to step S30. Accordingly, in this case, the LED 31 is not illuminated in the post-exposure time.

When it is judged that the continuous shot switch 15a is not in the on state in step S26, or when it is judged that the defocus value DEF is not set to 1 (DEF≠1) in step S27, the LED 31 is not illuminated in the post-exposure time in step S29. Or, the value of the second duty ratio D2, with which the pulse signal is supplied to the LED 31 in the post-exposure time in step S29, is 0%.

In step S30, the electric charge which is accumulated in the CCD in the exposure time is read, so that, in step S31, the electric charge which is read is stored in the memory of the photographing apparatus 1, as the image signal which is imaged by the imaging block 22. In step S32, the image signal which is stored, is indicated on the LCD monitor 17.

In step S33, it is judged whether the continuous shot switch 15a is in the on state. When it is judged that the continuous shot switch 15a is in the on state, the process is returned to step S16, so that the next exposure operation is carried out. When it is judged that the continuous shot switch 15a is not in the on state, the LED 31 is turned off in step S34. Or, the pulse signal is not supplied to the LED 31. In step S35, the control of the LED 31 in the post-exposure time, in a continuous shot mode (where the continuous shot switch 15a is in the on state), is finished.

Figure 7:
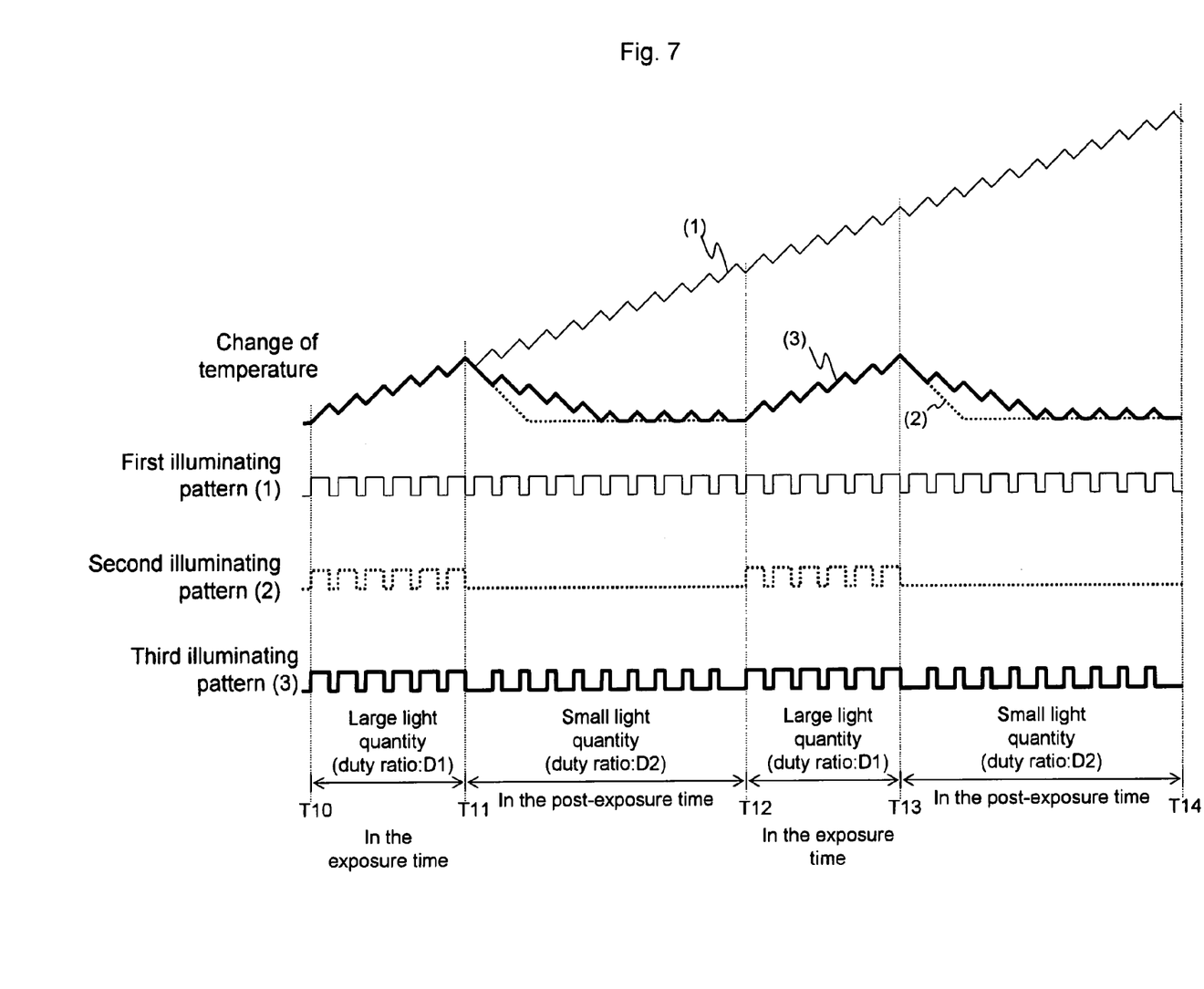
FIG. 7 is a timing chart which shows the relationship between the pulse signal and the temperature change of the LED when illuminating in the exposure time and in the post-exposure time.

The temperature change over time for the LED 31 is explained for the case where the illuminating of the LED 31 is controlled in the post-exposure time, in the continuous shot mode, by using the timing chart in FIG. 7. FIG. 7 shows first, second, and third illuminating patterns of the LED 31 in the post-exposure time, in the continuous shot mode.

The first illuminating pattern is the pattern in which the LED 31 is illuminated with the duty ratio which is the same for the exposure time, and the post-exposure time, in the continuous shot mode ((1) in FIG. 7).

The second illuminating pattern is the pattern in which the LED 31 is not illuminated in the post-exposure time, in the continuous shot mode ((2) in FIG. 7).

The third illuminating pattern is the pattern in which the LED 31 is illuminated with the first duty ratio D1 in the exposure time, and is illuminated with the second duty ratio D2 in the post-exposure time, in the continuous shot mode ((3) in FIG. 7). The combination of the second illuminating pattern and the third illuminating pattern is used in this embodiment.

In FIG. 7, the value of the first duty ratio D1 is larger than or equal to 50%, and the value of the second duty ratio D2 is smaller than 50%. Furthermore, the temperature rise over time when using the LED 31 (inclination in the positive direction) and the temperature descent over time when the LED 31 is turned off (inclination in the negative direction) are the same.

In the first illuminating pattern, the duty ratio when the LED 31 is illuminated in the exposure times (T10~T11, T12~T13), is the same as the duty ratio when the LED 31 is illuminated in the post-exposure times (T11~T12, T13~T14). Accordingly, because the lighting of the photographic subject is carried out in the post-exposure time, the operator can confirm the composition etc. of the photographing apparatus 1 in the post-exposure time. However, because the length of the period which the pulse signal is in the off state is not longer than the length of the period which the pulse signal is in the on state, every on/off cycle, in both the exposure time and post-exposure time, the temperature of the LED 31 does not drop. The rise in temperature of the LED 31 causes a decrease in light quantity.

For example, in the case where the value of the first duty ratio D1 is more than 50%, and where the temperature rise in unit time while the pulse signal is in the on state and the temperature descent in unit time while the pulse signal is in the off state are defined as the same, the temperature condition of the LED 31 can not be returned to the same condition as before the exposure operation (T10 in FIG. 7), by utilizing the time when the pulse signal is in the off state, so that the temperature of the LED 31 continues to go up with a certain degree (see FIG. 7).

In the second illuminating pattern, the LED 31 is illuminated only in the exposure times (T10~T11, T12~T13). Accordingly, the LED 31 is set in the off state in the post-exposure time, so that the temperature of the LED 31 decreases. However, because the LED 31 is not illuminated in the post-exposure time, so that the lighting of the photographic subject is not carried out in the post-exposure time, the operator cannot confirm the composition obtained by the photographing apparatus 1 in the post-exposure time.

For example, even in the case where the first duty ratio D1 is larger than 50%, and where the temperature rise in unit time while the pulse signal is in the on state and the temperature descent in unit time while the pulse signal is in the off state are defined as the same, the temperature of the LED 31 can be returned to the same condition as before the exposure operation (T10 in FIG. 7), by utilizing the time when the pulse signal is in the off state, under the condition where there is a sufficient length of post-exposure time (see FIG. 7).

In the third illuminating pattern, the LED 31 illuminates with a light quantity which is needed for imaging the photographic subject, in the exposure times (T10~T11, T12~T13), and the LED 31 illuminates the subject with a light quantity which is needed for the composition-confirmation, in the post-exposure times (T11~T12, T13~T14). The composition-confirmation can be carried out with a light quantity which is less than the quantity which is needed for imaging the photographic subject. Accordingly, the LED 31 can illuminate with a duty ratio which is less than that for the exposure time, in the post-exposure time. In this case, the LED 31 is used during the post-exposure time, however, it is possible to decrease the temperature of the LED 31 by utilizing the time when the pulse signal is in the off state in the post-exposure time.

For example, even in the case where the value of the first duty ratio D1 is larger than 50%, and where the temperature rise in unit time while the pulse signal is in the on state and the temperature descent in unit time while the pulse signal is in the off state are defined as the same, the temperature condition of the LED 31 can be returned to the same condition as before the exposure operation (T10 in FIG. 7), by utilizing the time when the pulse signal is in the off state, under the condition where there is a sufficient length of post-exposure time (see FIG. 7).

However, the post-exposure time needed for the third illuminating pattern is longer than that for the second illuminating pattern.

Furthermore, the operator can confirm the composition of the photographing apparatus 1 because of the lighting of the photographic subject in the post-exposure time by the LED 31.

When the result of the current AF sensing in the current exposure operation does not agree with the result of the previous AF sensing immediately after the photometric operation or that in the previous exposure operation, the lens control circuit 24*a* of the AF unit 24 is driven, and the lens position is changed, in the continuous shot mode, because composition-confirmation is necessary. However, except for this, composition-confirmation is unnecessary.

Accordingly, if the pulse signal can be supplied to the LED 31 according to the second illuminating pattern (steps S20 S21, and S29 in FIG. 6), and the third illuminating pattern (steps S20, and S28) combined, the composition-confirmation becomes possible, while restraining the temperature rise of the LED 31 by utilizing the turn-off time of the LED for lighting in a frame period, in other words, the post-exposure time.

Or, only in the case where composition-confirmation is necessary in the continuous shot mode, is the LED 31 illuminated with a duty ratio which is less than that of the exposure time, in the post-exposure time, in accordance with the flowchart in FIG. 6.

In this embodiment, it is explained that the post-exposure time is long enough to return the temperature of the LED 31 to the same condition as before the exposure operation. However, the post-exposure time may not be sufficient to allow this. Even if the temperature of the LED 31 can not be returned to the level before the exposure operation, it is possible to restrain the temperature rise of the LED 31, while the confirming composition in frame period by utilizing the post-exposure time.

The value of the first duty ratio D1 is not limited a value which is more than or equal to 50%, and the value of the second duty ratio D2 is not limited a value which is less than 50%.

Even if the first and second duty ratios D1 and D2 are not those in the above examples, when a rise in temperature over time, while illuminating with the LED 31, and a drop in temperature over time when the LED 31 is turned off are set up to be proper values, the effect of restraining the temperature rise of the LED 31 is obtained.

In this embodiment, the rise in temperature over time when illuminating with the LED 31 and the drop in temperature over time after turning-off the LED 31 are the same, however they do not have to be the same. Even if they are not the same, it is possible to restrain the rise in temperature of the LED 31 while confirming the composition in a frame period, by utilizing the post-exposure time which is the time between the exposure time termination and the next exposure time start.

FIGS. 6 and 7 show the case of the continuous shot mode, however even in the case of the video mode in which the video switch 16*a* is in the on state, it is possible to restrain the rise in temperature of the LED 31 while confirming the composition in a frame period, by utilizing the post-exposure time which is the time between the current exposure time termination (the current frame termination) and the next exposure time start (the next frame start).

In this embodiment, it was explained that the lighting device depends on radiation from an LED, however the lighting device may depend on other radiation devices which are driven by the pulse signals, and which illuminate a photographic subject. And further, whose temperature goes up due to continuation use, and whose light quantity falls due to the temperature rise.

In this embodiment, it was explained that the photographing apparatus 1 is a digital camera, however the photographing apparatus 1 may be a film camera.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2003-365965 (filed on Oct. 27, 2003), which is expressly incorporated herein by reference, in its entirety.

The invention claimed is:

1. A lighting control apparatus of a photographing apparatus, comprising:
   a release switch that is used for starting an exposure time; and
   an AF unit that performs an AF sensing operation and a focusing operation;
   a lighting device that illuminates a photographic subject by receiving a pulse signal which has a predetermined cycle;
   a continuous imaging control processor that performs a continuous imaging operation during which a plurality of images of said photographic subject are continuously imaged; and
   a pulse-signal generating processor that supplies said pulse signal to said lighting device with a first duty ratio in the exposure time, and with a second duty ratio, which is smaller than said first duty ratio, in a post-exposure time, which is the time between said exposure time termination and the next exposure time start, said second duty ratio being set to a value which is larger than 0%, when a result of a current AF sensing operation, which was performed immediately after said release switch was switched to the on state, is different from the result of a previous AF sensing operation, which was performed immediately before said release switch was switched to the on state.

2. The lighting control apparatus according to claim 1, wherein said second duty ratio is set to a value which is 0%, when said focusing operation is not performed because the result of the current AF sensing operation, which was performed immediately after said release switch was switched to the on state, is the same as the result of the previous AF sensing operation, which was performed immediately before said release switch was switched to the on state.

3. The lighting control apparatus according to claim 1, wherein an on/off cycle of said lighting device is synchronized with said predetermined cycle, during illumination.

4. The lighting control apparatus according to claim 3, wherein said predetermined cycle has a value such that flickering does not occur in said lighting device.

5. The lighting control apparatus according to claim 3, wherein said predetermined cycle has a value which is equal to or less than 1/50 second.

6. The lighting control apparatus according to claim 1, wherein said lighting device is used as an electric flash in said exposure time.

7. The lighting control apparatus according to claim 1, wherein said lighting device is used for confirming composition in said post-exposure time.

8. The lighting control apparatus according to claim 1, wherein said lighting device is an LED.

9. A lighting control apparatus of a photographing apparatus, the lighting control apparatus comprising:
   a release switch which, upon actuation, starts an exposure time;
   an AF unit that performs an AF sensing operation and a focusing operation;
   a lighting device that illuminates a photographic subject by receiving a pulse signal having a predetermined cycle;
   a continuous imaging controller that performs a continuous imaging operation in which a plurality of images of the photographic subject are imaged in response to a single actuation operation; and
   a pulse signal generator that supplies said pulse signal to said lighting device with a first duty ratio at an exposure time, and with a second duty ratio, which is smaller than said first duty ratio, at a post exposure time, the post-exposure time being a time between termination of an exposure and start of a next exposure, said second duty ratio being set to a value which is larger than 0%, when a result of a current AF sensing operation, which was performed immediately after the release switch was actuated, is different from a result of a previous AF sensing operation, which was performed immediately before the release switch was actuated.

10. The lighting control apparatus according to claim 9, wherein said second duty ratio is set to a value which is 0%, when said focusing operation is not performed because the result of the current AF sensing operation, which was performed immediately after said release switch was actuated, is the same as the result of the previous AF sensing operation, which was performed immediately before said release switch was actuated.

11. The lighting control apparatus according to claim 9, wherein an on/off cycle of said lighting device is synchronized with said predetermined cycle, during illumination.

12. The lighting control apparatus according to claim 11, wherein said predetermined cycle has a value such that flickering does not occur in said lighting device.

13. The lighting control apparatus according to claim 11, wherein said predetermined cycle has a value which is equal to or less than 1/50 second.

14. The lighting control apparatus according to claim 9, wherein said lighting device is configured to be used as an electric flash during the exposure time.

15. The lighting control apparatus according to claim 9, wherein said lighting device is configured to be used for confirming composition during the post exposure time.

16. The lighting control apparatus according to claim 9, wherein said lighting device comprises an LED.

* * * * *